U S010328920B2

(12) United States Patent
Kistner et al.

(10) Patent No.: US 10,328,920 B2
(45) Date of Patent: Jun. 25, 2019

(54) CONTROL DEVICE FOR AT LEAST ONE ELECTRIC PARKING BRAKE OF A BRAKE SYSTEM OF A VEHICLE AND METHOD FOR OPERATING A BRAKE SYSTEM OF A VEHICLE HAVING A BRAKE BOOSTER AND AN ELECTRIC PARKING BRAKE

(71) Applicant: Robert Bosch GmbH, Stuttgart (DE)

(72) Inventors: Matthias Kistner, Bretzfeld (DE); Otmar Bussmann, Abstatt (DE); Bertram Foitzik, Ilsfeld (DE); Klaus Heyer, Freiberg (DE)

(73) Assignee: ROBERT BOSCH GMBH, Stuttgart (DE)

( * ) Notice: Subject to any disclaimer, the term of this patent is extended or adjusted under 35 U.S.C. 154(b) by 219 days.

(21) Appl. No.: 14/890,368

(22) PCT Filed: May 5, 2014

(86) PCT No.: PCT/EP2014/059093
§ 371 (c)(1),
(2) Date: Nov. 10, 2015

(87) PCT Pub. No.: WO2014/184029
PCT Pub. Date: Nov. 20, 2014

(65) Prior Publication Data
US 2016/0075319 A1    Mar. 17, 2016

(30) Foreign Application Priority Data

May 13, 2013  (DE) .................. 10 2013 208 671

(51) Int. Cl.
*B60T 13/66* (2006.01)
*B60T 17/22* (2006.01)
(Continued)

(52) U.S. Cl.
CPC ............ *B60T 13/662* (2013.01); *B60T 7/042* (2013.01); *B60T 13/588* (2013.01); *B60T 13/741* (2013.01); *B60T 17/221* (2013.01)

(58) Field of Classification Search
None
See application file for complete search history.

(56) References Cited

U.S. PATENT DOCUMENTS 5,139,315 A     8/1992  Walenty et al.
6,062,656 A *   5/2000  Unterforsthuber ....... B60T 7/12
                                                          188/356

(Continued)

FOREIGN PATENT DOCUMENTS

CN       102700532 A      10/2012
DE           10348392 A1 *  5/2005  ............. B60T 7/107
(Continued)

*Primary Examiner* — Jelani A Smith
*Assistant Examiner* — Kelly D Williams
(74) *Attorney, Agent, or Firm* — Norton Rose Fulbright US LLP; Gerard Messina

(57) ABSTRACT

A control device for at least one electric parking brake of a vehicle brake system of a vehicle having a control instrument, to determine a setpoint variable regarding a setpoint braking torque to be generated with the parking brake and to output a control signal, the control instrument being configured to ascertain/detect, based on at least one provided signal, whether a brake booster is in at least one functionally limited or incapacitated state, and, if indicated, to determine the setpoint variable by considering at least one defined parameter regarding a requested total braking torque and to control the electric parking brake so that a corresponding actual braking torque is exertable with the parking brake. Also described is an electric parking brake for a vehicle brake system and to a vehicle brake system, and a method for operating a vehicle brake system having a brake booster and an electric parking brake.

9 Claims, 2 Drawing Sheets

(51) Int. Cl.
*B60T 13/74* (2006.01)
*B60T 7/04* (2006.01)
*B60T 13/58* (2006.01)

(56) References Cited

U.S. PATENT DOCUMENTS

2003/0066719 A1* 4/2003 Watanabe .............. B60T 1/005
                                                    188/72.7
2011/0006591 A1* 1/2011 Yoshii .................... B60T 7/12
                                                      303/4

FOREIGN PATENT DOCUMENTS

| DE | 10 2006 048 910 | 4/2008 |
| DE | 10 2008 024 019 | 11/2009 |
| DE | 10 2009 026 973 | 7/2010 |
| DE | 10 2011 088 938 | 7/2012 |
| DE | 102011005842 A1 | 9/2012 |
| DE | 10 2011 110 892 | 2/2013 |
| EP | 1 172 272 | 1/2002 |
| JP | 2013-071521 A | 4/2013 |
| WO | 2012156130 A1 | 11/2012 |

* cited by examiner

CONTROL DEVICE FOR AT LEAST ONE ELECTRIC PARKING BRAKE OF A BRAKE SYSTEM OF A VEHICLE AND METHOD FOR OPERATING A BRAKE SYSTEM OF A VEHICLE HAVING A BRAKE BOOSTER AND AN ELECTRIC PARKING BRAKE

FIELD OF THE INVENTION

The present invention relates to a control device for at least one electric parking brake of a brake system of a vehicle. The present invention also relates to an electric parking brake for a brake system of a vehicle and to a brake system for a vehicle. Furthermore, the present invention relates to a method for operating a brake system of a vehicle having a brake booster and an electric parking brake.

BACKGROUND INFORMATION

German document DE 10 2009 026 973 A1 discusses a brake system for a motor vehicle and a method for controlling it. The brake system includes an hydraulic service brake system having a master brake cylinder and multiple wheel brakes connected to the master brake cylinder and an electromechanical service brake system having electromechanical brakes. In addition, the brake system also has a mechanical brake booster situated on the master brake cylinder. In the event of a failure of the hydraulic service brake system, braking a vehicle equipped with the brake system is still to be possible using the electromechanical service brake system. At the same time, it is to be possible, using the electromechanical brake booster, to generate a force acting against a brake pedal actuation in such a way that a driver of the vehicle still senses a resistance when depressing the brake pedal. In this manner, in particular a leakage in the hydraulic system is to be imperceptible to the driver of the vehicle.

SUMMARY OF THE INVENTION

The present invention creates an control device for at least one electric parking brake of a brake system of a vehicle having the features described herein, an electric parking brake for a brake system having the features described herein, a brake system for a vehicle having the features described herein and a method for operating a brake system of a vehicle having a brake booster and an electric parking brake having the features described herein.

By a targeted use of the electric parking brake, the present invention makes it possible to relieve a driver of a vehicle in terms of force when braking the vehicle even when a brake booster installed in the vehicle is in at least one functionally limited or functionally incapacitated state. Particularly in a situation, in which the driver requests an intense and quick braking of his vehicle even though the brake booster is in the at least one functionally limited or functionally incapacitated state, the electric parking brake may be used in an inventive manner in such a way that the requested braking process does not involve a significant expenditure of force on the part of the driver. The present invention thus ensures an improved braking comfort for the driver, which is still ensured even in the event of a total failure of the brake booster.

Modern vehicles are usually equipped with brake boosters. The present invention may thus be utilized for a multitude of vehicles.

The present invention may also be utilized in particular to ensure adherence to the legal requirements for the braking effect to be achieved even in the event of a total failure of the brake boosting action of a hydraulic brake system. Even in extreme cases, i.e. in case of a disadvantageous configuration of the hydraulics of the brake system, this advantage is ensured.

In one advantageous specific embodiment, the control instrument is configured to ascertain whether the brake booster is in the at least one functionally limited or functionally incapacitated state on the basis of at least one sensor signal provided as the at least one signal by at least one sensor of the vehicle. The control device itself is thus able to monitor the brake booster. It is thus possible to omit an otherwise usable monitoring device that is separate from the control device for monitoring the brake booster.

In particular, the control instrument may be configured to compare the at least one sensor signal provided by at least one pressure sensor as the at least one sensor of the vehicle to at least one defined parameter and/or to at least one setpoint pressure signal derived from the at least one defined parameter, and to ascertain on the basis of the comparison whether the brake booster is in the at least one functionally limited or functionally incapacitated state. Customarily, at least one pressure sensor is installed in a brake system. Thus, to use the control device, it is possible to make use of components that already exist in a multitude of brake systems. It is thus normally not necessary to equip the brake system cooperating with the control device with an additional sensor, although it may be advantageous.

The advantages listed above are also ensured in the case of an electric parking brake for a brake system of a vehicle having such a control device.

In one advantageous specific embodiment, the electric parking brake is configured as an autoelectric parking brake caliper.

The electric parking brake may include a pin, for example, which is able to be pressed onto a brake lining in such a way that the actual braking torque corresponding to the determined setpoint braking torque is able to be applied onto an associated wheel. In this manner, a cost-effective type of the electric parking brake may be used successfully for implementing the present invention.

A brake system for a vehicle having an electric parking brake, a brake booster and a corresponding control device also brings about the advantages described above.

The electric parking brake may be configured as an autoelectric parking brake caliper. The brake system may thus be equipped with a cost-effective electric parking brake.

Furthermore, the advantages described above are able to be realized by executing the method for operating a brake system of a vehicle having a brake booster and an electric parking brake. The method may be configured further in accordance with the specific embodiments described above.

In one advantageous specific embodiment of the method, an ascertainment is made as to whether the brake booster is in the at least one functionally limited or functionally incapacitated state by comparing at least one pressure variable ascertained in at least one hydraulic system of the brake system to the at least one defined parameter and/or to at least one setpoint pressure variable derived from the at least one defined parameter. Thus, the method may normally also be implemented without the brake system being equipped with an additional sensor.

Additional features and advantages of the present invention are explained below with reference to the figures.

DETAILED DESCRIPTION

Figure 1:
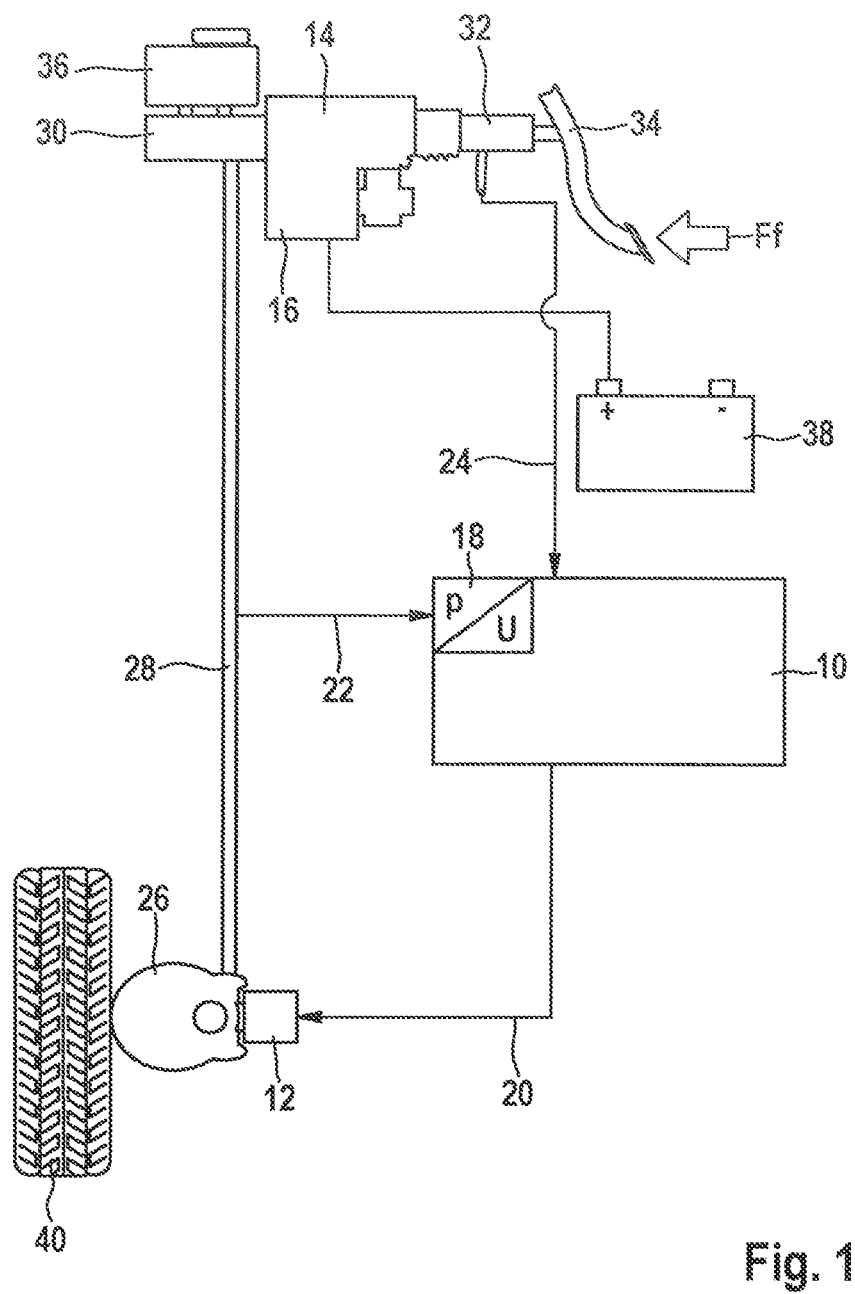
FIG. 1 shows a schematic representation of a specific embodiment of the sensor device.

FIG. 1 shows a schematic representation of a specific embodiment of the control device.

The control device 10 shown schematically in FIG. 1 may be used in a brake system of a motor vehicle. Control device 10 may be used advantageously particularly in a brake system of a vehicle having an electric parking brake 12 and a brake booster 14. Control device 10 may be used to control at least the electric parking brake 12 of the brake system. It should be pointed out, however, that the control device 10 described in the following may also be configured further in such a way that control device 10 is able to control other components of the brake system as well, in addition to electric parking brake 12.

Electric parking brake 12 may be configured to act on a front axle of the vehicle. Alternatively, however, electric parking brake 12 may also be used on a rear axle of the vehicle or on both axles of the vehicle.

Control device 10 may be configured separately of a control unit 16 of brake booster 14. Control device 10 may in particular be integrated into electric parking brake 12. As an alternative, control device 10 may also be integrated into a control electronics of the entire brake system. In this manner, it is also possible to reduce a required installation space of the brake system equipped with control device 10.

Control device 10 has a control instrument 18, which is able to determine a setpoint variable regarding a setpoint braking torque to be generated by electric parking brake 12. Subsequently, a control signal 20 corresponding to the determined setpoint variable is able to be output to electric parking brake 12. Electric parking brake 12 may be controlled by control signal 20 in a current operating mode.

Control instrument 18 is additionally configured to ascertain or detect, on the basis of at least one provided signal 22, whether brake booster 14 of the brake system is in at least one functionally limited or functionally incapacitated state. If control instrument 18 ascertains or detects that brake booster 14 is in the at least one functionally limited or functionally incapacitated state, control instrument 18 is able to determine the setpoint variable by taking into account at least one provided defined parameter 24 regarding a total braking torque requested by a driver of the vehicle. Subsequently, electric parking brake 12 may be controlled by control signal 20 in such a way that an actual braking torque corresponding to the determined setpoint variable is able to be applied by electric parking brake 12 is such a way the vehicle is able to be braked at least by the actual braking torque.

Control device 10 is thus able to ensure a fallback level in the event that brake booster 14 is in the at least one functionally limited or functionally incapacitated state, in which the driver, in spite of the at least limited usability of brake booster 14, is still able to be supported in terms of force when braking the vehicle due to the additional usage of electric parking brake 12 described above. The driver brake force Ff to be applied by the driver for building up a brake torque in at least one wheel brake cylinder 26 is therefore able to be reduced by the additional use of electric parking brake 12 compared to a driver braking force Ff required for the unassisted buildup of the same braking torque. This may also be circumscribed as a use of electric parking brake 12 controlled by control device 10 for reducing the driver braking force Ff required for braking the vehicle.

In particular, electric parking brake 12 may be controlled by control device 10 in such a way that even in a total failure of brake booster 14, a deceleration requested by the driver may still be effected using the same driver braking force Ff as in a fully functional brake booster 14. Using control device 10, it is thus possible to compensate for a functional impairment or a failure of brake booster 14. Even a relatively high deceleration may in this case still be achievable by a uniform and relatively low expenditure of force.

Brake booster 14 may be e.g. an electromechanical brake booster 14. It should be noted, however, that control device 10 is able to bridge a functional impairment or a failure of a plurality of different types of brake booster 14 at least temporarily by controlling/activating electric parking brake 12. The use of control device 10 is thus not limited to a specific type of brake booster 14 of the brake system.

Control instrument 18 may be configured in such a way for example that it detects that brake booster 14 is in the at least one functionally limited or functionally incapacitated state on the basis of a provided information signal or warning signal. Particularly the control unit of brake booster 14 is able to provide such an information signal or warning signal to control instrument 18. However, control instrument 18 may be configured in such a way that it ascertains whether brake booster 14 is in the at least one functionally limited or functionally incapacitated state on the basis of at least one sensor signal 22 provided as the at least one signal 22 by at least one sensor of the vehicle. Control instrument 18 is thus also able to monitor brake booster 14. Control instrument 18 may thus be additionally used to replace a monitoring device of brake booster 14, which is otherwise configured separately.

In the specific embodiment of FIG. 1, control instrument 18 is configured to compare the at least one sensor signal 22 provided by at least one pressure sensor as the at least one sensor (not shown) of the vehicle to the at least one defined parameter 24 and/or to at least one setpoint pressure signal derived from the at least one defined parameter 24. The at least one sensor signal 22 used in the comparison may thus include in particular a pressure prevailing in at least one line 28 of the brake system, in a master brake cylinder 30 of the brake system and/or in the at least one wheel brake cylinder 26. For example, the at least one sensor signal 22 may comprise a master brake cylinder internal pressure, an admission pressure, a wheel brake cylinder pressure and/or a corresponding variable. Above all, it is possible to use a pressure sensor situated in a brake caliper for providing the at least one sensor signal 22.

The at least one defined parameter 24 may be able to be provided to control device 10 by way of a brake actuation element sensor/pedal travel pickup 32 such as a pedal travel sensor 32 for example. Such a configuration of control device 10 thus also makes it possible to use a brake actuation element sensor 32, which may be located between a brake actuation element 34 (such as a brake pedal for example) and the brake booster 14 or the master brake cylinder 30, with an increased multi-functionality.

In the specific embodiment of FIG. 1, the control instrument 18 is configured to ascertain whether the brake booster 14 is in the at least one functionally limited or functionally incapacitated state on the basis of the comparison (of the at least one sensor signal 22 to the at least one defined parameter 24 and/or to the at least one setpoint pressure signal derived from it). In this manner, even a slightly limited functionality of brake booster 14 may be detected reliably and with great accuracy.

As hydraulic components of the brake system equipped with control device 10, FIG. 1 shows only one wheel brake cylinder 26, master brake cylinder 30, a line 28 running between master brake cylinder 30 and wheel brake cylinder 26 and a brake fluid reservoir 36. However, the brake system interacting with control device 10 may also have other hydraulic components. In particular, the brake system may have a plurality of different brake circuits, without this impairing the usability of control device 10. The brake system may furthermore comprise at least one electrical component such as e.g. a generator (not sketched) for charging battery 38.

For improved vehicle stability, the electric parking brake 12 may be situated on the wheels of the front axle. A usage of electric parking brake 12 on the wheels of the rear axle is not excluded, however.

Electrical parking brake 12 may be configured as an autoelectric parking brake caliper (autoelectric parking brake, APD). In particular, electric parking brake 12 may include a pin/actuator, which is able to be pressed onto a brake lining in such a way that the actual braking torque corresponding to the specified setpoint braking torque is able to be applied onto an associated wheel 40. The pin/actuator of electric parking brake 12 may thus be used to implement a fallback level, or a "modified brake booster".

Already cost-effective brake calipers are often configured in such a way that a pin/actuator presses on the piston bottom and thus on the brake lining. The braking force additionally provided in this manner by way of electric parking brake 12 may be advantageously superimposed with a hydraulically transmitted force (which is, however, only non-boosted because of the functional impairment or failure of brake booster 14). In this manner, higher decelerations are achievable even in the event of a failure of brake booster 14. One development provides for a pressure sensor to be installed in the caliper of electric parking brake 12.

The advantages explained above are also ensured in an electric parking brake 12 comprising control device 10 and/or in a brake system for a vehicle including electric parking brake 12, brake booster 14 and control device 10. Even in such a brake system, the electric parking brake may be configured as an autoelectric parking brake caliper.

Figure 2:
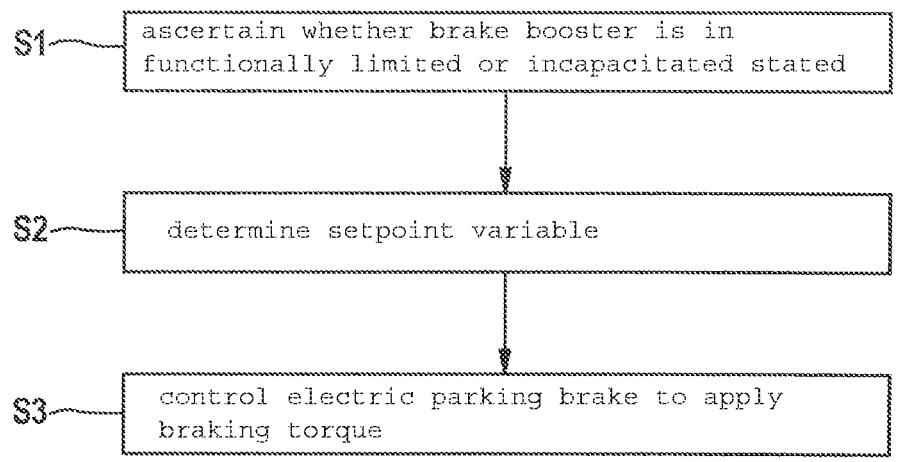
FIG. 2 shows a flow chart for explaining a specific embodiment of the method for operating a brake system of a vehicle having a brake booster and an electric parking brake.

FIG. 2 shows a flow chart for explaining a specific embodiment of the method for operating a brake system of a vehicle having a brake booster and an electric parking brake.

The method explained below may be implemented for example by the control device 10 explained above. The feasibility of the method, however, is not limited to the use of such a control device.

In a method step S1, an ascertainment is made as to whether the brake booster is in at least one functionally limited or functionally incapacitated state. In particular, it is possible to ascertain whether the brake booster is in the at least one functionally limited or functionally incapacitated state by comparing at least one pressure variable ascertained in at least one hydraulic brake system with at least one defined parameter regarding a total braking torque requested by a driver of the vehicle and/or with at least one setpoint pressure variable derived from the at least one defined parameter. Examples for the at least one defined parameter and the at least one pressure variable are mentioned above.

The further method steps S2 and S3 are performed if it is ascertained that the brake booster is in the at least one functionally limited or functionally incapacitated state. In method step S2, a setpoint variable is determined regarding a setpoint braking torque to be generated with the aid of the electric parking brake for braking the vehicle. The determination of the setpoint variable occurs by taking into account the at least one defined parameter regarding the total braking torque requested by the driver.

In method step S3, the electric parking brake is controlled in such a way that an actual braking torque corresponding to the determined setpoint variable is exerted with the aid of the electric parking brake for braking the vehicle. By way of the method it is also possible to bridge at least temporarily a functional limitation or a total failure of the brake booster. The method thus provides the advantages already described above.

What is claimed is:

1. An electric parking brake for a brake system for a vehicle, comprising:
a control device for the electric parking brake, including:
a control instrument to determine a setpoint variable regarding a setpoint braking torque to be generated by the electric parking brake and to output a control signal to the electric parking brake corresponding to the determined setpoint variable;
wherein the control instrument is configured to ascertain or detect, based on at least one provided signal, whether a brake booster of the brake system is in at least one functionally limited or functionally incapacitated state, and the control instrument is configured to, when the brake booster is ascertained or detected to be in the at least one functionally limited or functionally incapacitated state: (i) determine the setpoint variable by taking into account at least one provided defined parameter regarding a total braking torque requested by a driver of the vehicle, and (ii) control the electric parking brake by the control signal so that an actual braking torque corresponding to the setpoint variable is exerted with the electric parking brake so that the vehicle is braked at least by the actual braking torque;
wherein the control instrument is configured to ascertain whether the brake booster is in the at least one functionally limited or functionally incapacitated state based on at least one sensor signal provided as the at least one signal by at least one sensor of the vehicle, the at least one sensor signal providing a pressure prevailing in at least one wheel brake cylinder; and
wherein the control instrument is configured to compare the at least one sensor signal provided by at least one pressure sensor as the at least one sensor of the vehicle to the at least one provided defined parameter regarding the total braking torque requested by the driver of the vehicle and/or to at least one setpoint pressure signal determined by taking into account the at least one provided defined parameter regarding the total braking torque requested by the driver of the vehicle, and to ascertain based on the comparison whether the brake booster is in the at least one functionally limited or functionally incapacitated state.

2. The electric parking brake of claim 1, wherein the electric parking brake includes an autoelectric parking brake caliper.

3. The electric parking brake of claim 2, wherein the electric parking brake includes a pin, which is press-able onto a brake lining so that the actual braking torque corresponding to the determined setpoint braking torque is applicable onto an associated wheel.

4. The electric parking brake as recited in claim 1, wherein the at least one sensor is a pressure sensor situated in a brake caliper.

5. A brake system for a vehicle, comprising:
   an electric parking brake;
   a brake booster; and
   a control device for the electric parking brake of the brake system of the vehicle, including:
      a control instrument to determine a setpoint variable regarding a setpoint braking torque to be generated by the electric parking brake and to output a control signal to the electric parking brake corresponding to the determined setpoint variable;
      wherein the control instrument is configured to ascertain or detect, based on at least one provided signal, whether a brake booster of the brake system is in at least one functionally limited or functionally incapacitated state, and the control instrument is configured to, when the brake booster is ascertained or detected to be in the at least one functionally limited or functionally incapacitated state: (i) determine the setpoint variable by taking into account at least one provided defined parameter regarding a total braking torque requested by a driver of the vehicle, and (ii) control the electric parking brake by the control signal so that an actual braking torque corresponding to the setpoint variable is exerted with the electric parking brake so that the vehicle is braked at least by the actual braking torque;
      wherein the control instrument is configured to ascertain whether the brake booster is in the at least one functionally limited or functionally incapacitated state based on at least one sensor signal provided as the at least one signal by at least one sensor of the vehicle, the at least one sensor signal providing a pressure prevailing in at least one wheel brake cylinder; and
      wherein the control instrument is configured to compare the at least one sensor signal provided by at least one pressure sensor as the at least one sensor of the vehicle to the at least one provided defined parameter regarding the total braking torque requested by the driver of the vehicle and/or to at least one setpoint pressure signal determined by taking into account the at least one provided defined parameter regarding the total braking torque requested by the driver of the vehicle, and to ascertain based on the comparison whether the brake booster is in the at least one functionally limited or functionally incapacitated state.

6. The brake system of claim 5, wherein the electric parking brake includes an autoelectric parking brake caliper.

7. The brake system as recited in claim 5, wherein the at least one sensor is a pressure sensor situated in a brake caliper.

8. A control device for an electric parking brake of a brake system of a vehicle, comprising:
   a control instrument to determine a setpoint variable regarding a setpoint braking torque to be generated by the electric parking brake and to output a control signal to the electric parking brake corresponding to the determined setpoint variable;
   wherein the control instrument is configured to ascertain or detect, based on at least one provided signal, whether a brake booster of the brake system is in at least one functionally limited or functionally incapacitated state, and the control instrument is configured to, when the brake booster is ascertained or detected to be in the functionally limited or functionally incapacitated state: (i) determine the setpoint variable by taking into account at least one provided defined parameter regarding a total braking torque requested by a driver of the vehicle, and (ii) control the electric parking brake by the control signal so that an actual braking torque corresponding to the setpoint variable is exerted with the electric parking brake so that the vehicle is braked at least by the actual braking torque;
   wherein the control instrument is configured to ascertain whether the brake booster is in the at least one functionally limited or functionally incapacitated state based on at least one sensor signal provided as the at least one signal by at least one sensor of the vehicle, the at least one sensor signal providing a pressure prevailing in at least one wheel brake cylinder; and
   wherein the control instrument is configured to compare the at least one sensor signal provided by at least one pressure sensor as the at least one sensor of the vehicle to the at least one provided defined parameter regarding the total braking torque requested by the driver of the vehicle and/or to at least one setpoint pressure signal determined by taking into account the at least one provided defined parameter regarding the total braking torque requested by the driver of the vehicle, and to ascertain based on the comparison whether the brake booster is in the at least one functionally limited or functionally incapacitated state.

9. The control device as recited in claim 8, wherein the at least one sensor is a pressure sensor situated in a brake caliper.

* * * * *